United States Patent
Koellnberger

(10) Patent No.: US 8,859,477 B2
(45) Date of Patent: Oct. 14, 2014

(54) SILICONE SOLVENT

(75) Inventor: Andreas Koellnberger, Kirchdorf (DE)

(73) Assignee: Wacker Chemie AG, Munich (DE)

( * ) Notice: Subject to any disclaimer, the term of this patent is extended or adjusted under 35 U.S.C. 154(b) by 0 days.

(21) Appl. No.: 14/123,848

(22) PCT Filed: Jun. 4, 2012

(86) PCT No.: PCT/EP2012/060531
§ 371 (c)(1),
(2), (4) Date: Dec. 4, 2013

(87) PCT Pub. No.: WO2012/168203
PCT Pub. Date: Dec. 13, 2012

(65) Prior Publication Data
US 2014/0135251 A1    May 15, 2014

(30) Foreign Application Priority Data

Jun. 6, 2011 (DE) .......................... 10 2011 077 004

(51) Int. Cl.
*C11D 17/00* (2006.01)
*C08K 3/32* (2006.01)
*C11D 7/50* (2006.01)
*C08L 83/04* (2006.01)

(52) U.S. Cl.
CPC ................ *C11D 7/5009* (2013.01); *C08K 3/32* (2013.01); *C08L 83/04* (2013.01)

USPC ............................ 510/175; 510/176; 510/177

(58) Field of Classification Search
USPC ......................................................... 510/175
See application file for complete search history.

(56) References Cited

U.S. PATENT DOCUMENTS

| 2,710,843 | A | 6/1955 | Stebleton |
| 3,839,388 | A | 10/1974 | Nitzsche et al. |
| 5,008,229 | A * | 4/1991 | Schuster et al. ............. 502/167 |
| 6,001,888 | A | 12/1999 | Friebe et al. |

FOREIGN PATENT DOCUMENTS

| DE | 3725377 A1 | 2/1989 |
| DE | 19607264 A1 | 9/1996 |
| DE | 69122740 T2 | 4/1997 |
| EP | 0709422 A2 | 5/1996 |
| EP | 0496899 B1 | 10/1996 |
| EP | 0884368 A1 | 12/1998 |
| GB | 2298429 A | 9/1996 |
| JP | 8250400 | 9/1996 |

* cited by examiner

*Primary Examiner* — Necholus Ogden, Jr.
(74) *Attorney, Agent, or Firm* — Brooks Kushman P.C.

(57) ABSTRACT

A composition comprising a phosphonitrile halide and an oligomeric organopolysiloxanes having from 10 to 50 Si units is effective to remove silicone residues from substrates with minimal swelling of thin polymer substrates.

6 Claims, No Drawings

SILICONE SOLVENT

CROSS-REFERENCE TO RELATED APPLICATIONS

This application is the U.S. National Phase of PCT Appln. No. PCT/EP2012/060531 filed Jun. 4, 2012, which claims priority to German Application No. 10 2011 077 004.6 filed Jun. 6, 2011, the disclosures of which are incorporated in their entirety by reference herein.

BACKGROUND OF THE INVENTION

1. Field of the Invention

The present invention relates to a composition containing a phosphonitrile halide catalyst and also linear polydimethylsiloxanes having a defined MW range and defined chain length for depolymerization and removal of silicone residues. The composition of the present invention is particularly useful for removing crosslinked or uncrosslinked, filled or unfilled silicone residues from sensitive surfaces and substrates. The silicone dissolver can be liquid, pasty or gel-like in the various applications, depending on the field of use.

2. Description of the Related Art

Various methods and compositions for removing or depolymerizing crosslinked or uncrosslinked silicones are known in the prior art, for example Swelling and removing with an organic or halogenated organic solvent;

Swelling and removing with an amine such as diisopropylamine;

Depolymerizing the polydimethylsiloxane with alkaline solutions of strong bases such as sodium hydroxide or potassium hydroxide as described for example in U.S. Pat. No. 2,710,843;

Depolymerizing with short-chain or cyclic oligodiorganosiloxanes as described for example in DE 69122740 T2;

Depolymerizing with aqueous solutions of strong acids such as for example alkylbenzenesulphonic acids, sulphuric acid, hydrofluoric acid as described for example in JP 8250400 A; and Depolymerizing with a composition containing phosphonitrile halide compounds and short-chain oligodimethylsiloxanes of up to 7 Si-chain members as described for example in EP 0 884 368 A1.

The contrary use of cyclic or linear phosphonitrile halide compounds as chain growth addition or condensation polymerization catalyst to prepare long-chain polydimethylsiloxanes is long-established prior art, as is using the catalyst to equilibrate polydimethylsiloxanes as described in DE 196 07 264 A1.

U.S. Pat. No. 5,008,229 is directed to solutions of phosphonitrile chlorides in an organic solvent and the use of such compositions to accelerate the condensation and/or equilibration of hydroxyl-terminated diorganosiloxanes. Although improved results are obtained, an organic solvent such as ethyl acetate is used to facilitate the dissolution of the phosphonitrile chloride. DE 37 25 377 eliminates the use of an organic solvent by using a reaction product of a phosphorus-nitrogen chloride and of a cyclic diorganosiloxane, such as octamethylcyclotetrasiloxane, as catalyst. Experience has shown, however, that reaction products of phosphorus-nitrogen chloride and octamethylcyclotetrasiloxane frequently have viscosities exceeding several thousand mPa·s (centipoises), making the materials less useful as catalysts for removing polydimethylsiloxane residues.

The disadvantage of all silicone dissolvers heretofore available is that they contain solvent or contain corrosive substances such as acids or alkali which, when used to remove silicones from diverse plastics substrates for example, attack these substrates or cause the substrates to swell. Other surfaces such as metals or semiconductors for example may suffer corrosive attack.

The problem addressed by the present invention was therefore that of providing a composition that is useful for removing crosslinked and uncrosslinked polysiloxane residues from various substrates or from between substrates, but is inert with regard to the substrates and does not damage, corrode or swell them even as a thin layer. There are many applications where it is especially the swelling of thin substrates which plays a decisive part when the silicone-dissolving composition is used in processes where it comes into direct contact with other plastics. A surprising finding was a direct relationship between the chain length of the linear siloxanes used and the swelling of plastics present as a thin layer, particularly below a layer thickness of 250 μm.

SUMMARY OF THE INVENTION

This problem was surprisingly solved by a composition containing

A) at least one phosphonitrile halide compound, and

B) at least one linear polydimethylsiloxane having a chain length of 10 to 50 Si units and a molar mass of 730 g/mol to 5000 g/mol.

DETAILED DESCRIPTION OF THE PREFERRED EMBODIMENTS

The compositions of the present invention are particularly useful for removing polysiloxane residues or layers on or between substrates.

The composition of the present invention has the advantage that it acts selectively on silicone polymers and/or polydimethylsiloxane groups. Other plastics are not attacked, owing to the mechanism of the reaction. Examples of plastics that are inert toward the composition of the present invention are: polyolefin, polystyrene, polyvinyl chloride, polyethylene, polypropylene, polynitrile, acrylonitrile-butadiene-styrene copolymers or polyacrylate.

Compositions of the present invention merely dissolve for example addition-crosslinked, condensation-crosslinked and peroxidically crosslinked silicone rubbers (RTV-1 RTV-2 LSR and HTV). The composition of the present invention is also effective in relation to silicone rubbers which, depending on the field of use, contain further components such as fillers, for example hydrophilic or hydrophobic silicas, precipitated silicas, aluminium oxides, titanium oxides, carbon black, graphites, metals, metal carbonates, diatomaceous earths, metal dusts, fibres such as glass fibres or polymeric fibres and miscellaneous additives such as fungicides, scents, corrosion inhibitors, oxidation inhibitors, light stabilizers, flame retardants, dispersants, adhesion promoters, pigments, plasticizers, organic polymers or heat stabilizers. The compositions of the present invention also degrade copolymers containing polydiorganosiloxane units or silicone resins.

There are many applications where avoiding the swelling of thin substrates plays a decisive part, especially when the silicone-dissolving composition is used in processes where it comes into direct contact with other plastics. A surprising finding was a direct relationship between the chain length of B) and the swelling of plastics as thin layer; short-chain B) up to 9 Si units must be avoided when layer thicknesses are below 200 μm in particular, since they lead to an undesired swelling of these plastics, thus resulting in damage and hence in the production of reject material.

The use of B) with 50 or more Si units in turn has the disadvantage that the silicone rubbers are significantly slower to dissolve owing to the slower diffusion.

In one preferred embodiment, component A) conforms to general formula (1):

$$Hal_3P(NPHal)_nNPHal_3 \cdot PHal_6, \quad (1)$$

where n is 0-4 and preferably 1 or 2, and

Hal is either Cl or Br or I.

Compounds A) are long known in the art and are obtainable for example by following processes described in U.S. Pat. No. 3,839,388.

In one preferred embodiment, component B) conforms to general formula (2):

$$R(R^1)_2Si[OSi(R^1)_2]_mOSi(R^1)_2R, \quad (2)$$

where

R is hydrogen or a monovalent organic $C_{1-18}$ group, $R^1$, which is the same or different on each occurrence, is a monovalent organic $C_{1-18}$ group and preferably methyl, vinyl, phenyl or hydroxyl, and m is an integer from 8 to 65.

Preferred embodiments relating to the organogroups R of formula (2) include $C_{1-8}$ alkyl moieties, for example methyl, ethyl, propyl, butyl and haloalkyl moieties such as trifluoropropyl. R may additionally be $C_{1-8}$ alkenyl, such as vinyl and allyl; $C_{3-8}$ cycloalkyl such as cyclopropyl, and cycloalkenyl such as cyclopentyl. R also includes $C_{6-13}$ aryl moieties such as phenyl, tolyl, xylyl and naphthyl and also haloaryl, for example chlorophenyl. It is particularly preferable for R to be methyl, vinyl or phenyl. The meanings of $R^1$ in formula (2) include all monovalent organic $C_{1-18}$ moieties mentioned above for R.

Preferably, the end groups of component B) are trimethylsilyl or dimethylvinylsilyl end groups.

By way of further optional constituent, compositions of the present invention may contain thickeners C) in order to adjust the viscosity and produce pasty compositions for example. Examples of thickeners C) are: precipitated silica, hydrophilic or hydrophobic colloidal silica, aluminium oxide, titanium dioxide, calcium salts of carboxylic acids, carbon black or carboxymethylcellulose. Any thickener known in the prior art can be used as long as it has a water content below 5000 ppm. The water content should preferably be below 2500 ppm and more preferably below 1000 ppm. Organic aliphatic alcohol groups must also be avoided in the composition since they, similarly to water, cause component A) to hydrolyse and the composition would lose its equilibration property. It is preferable for C) to be selected from the group of pyrogenic silicas.

The composition of the present invention is prepared by mixing A) with B) and optionally C) ideally until a clear solution has formed.

It is preferable to use 0.1-3.0 parts by weight of A) per 100 parts by weight of B). The dynamic viscosity scarcely increases during mixing. The composition of the present invention has a viscosity in the range of about 5-1000 mm²/s mPa·s. Viscosity particulars are based on a temperature of 20° C. and a shear rate of 0.9 s⁻¹.

When C) is also used, this is done to adjust the viscosity of the composition of the present invention to a defined range. For this, C) is used in amounts of 0.5-30 parts by weight per 100 parts by weight of B). It is preferable to add from 2 to 25 parts by weight and more preferably from 5 to 20 parts by weight.

Mixing is typically effected by intensive stirring of the components for between 0.5 and 10 hours at room temperature or elevated temperature (up to 140° C.). In one preferred version mixing takes place under an inert gas atmosphere (for example nitrogen or argon). After a clear solution has formed, volatiles can be removed under reduced pressure.

The present invention further provides for the use of the composition of the present invention for depolymerization and removal of crosslinked or uncrosslinked silicone residues from surfaces or substrates.

Depending on the viscosity of the compositions according to the present invention—liquid, pasty or gel like, this is effected in various ways, for example by spraying or carrying the composition of the present invention onto the article/surface/substrate to be cleaned or else by dipping the article to be cleaned into the composition of the present invention. Depending on the layer thickness and composition of the silicone residues to be removed, the treatment time can be between 10 s and several hours. In one preferred embodiment, treatment time is between 30 s and 10 min. Temperature elevation during treatment time accelerates the dissolving process. Temperatures between 20° C. and 150° C. can be used, while the temperature range from 20° C. to 100° C. can be stated to be preferable. Any circulation of the composition according to the present invention, for example by pumping, shaking or ultrasonication, likewise has an accelerating effect. In one preferred embodiment, the treatment time at room temperature under ultrasonication is between 10 s and 5 min. In a further preferred embodiment, the treatment time at 80° C.-120° C. under ultrasonication is between 10 s and 3 min.

Following the treatment time period, the products are ideally first washed off with a short-chain polydimethylsiloxane which is subsequently removed with a solvent such as, for example, isopropanol, ethyl acetate or the like. This ensures that the deployed compound A) cannot cleave into corrosion products.

The examples which follow illustrate the invention without limiting it. Parts are by weight, unless otherwise stated. The examples hereinbelow are carried out at a pressure of the surrounding atmosphere, i.e. approximately at 1000 hPa and, unless otherwise stated, at room temperature, i.e. about 20° C. Viscosities are based on a temperature of 25° C. In application examples of dissolving crosslinked silicone elastomers, ultrasonication is effected by introducing a glass flask into an ultrasonic bath (Bandelin RM 40), by introducing an ultrasonic probe or the like.

EXAMPLE 1

Silicone-Dissolving Composition 1

A 100 g quantity of trimethylsilyl-terminated polydimethyl-siloxane having a viscosity of 5 mPa·s and a minimum chain length of 10 Si units (average chain length: 15 units) is mixed with 0.5 g of phosphonitrile chloride and the mixture is stirred at room temperature for 2 hours. Any undissolved phosphonitrile chloride is removed by decanting off the supernatant active solution. What is subsequently further used is the decanted-off solution and not the residue (undissolved phosphonitrile chloride).

EXAMPLE 2

Silicone-Dissolving Composition 2

A 100 g quantity of trimethylsilyl-terminated polydimethylsiloxane having a viscosity of 5 mPa·s and a minimum chain length of 10 Si units (average chain length: 15 units) is mixed with 0.5 g of phosphonitrile chloride and the mixture is stirred at 100° C. for 1 hour. A clear solution forms, from which phosphonitrile chloride may possibly precipitate again after cooling and which is removed as in Example 1 by decanting off the solution. What is subsequently further used is the decanted-off solution and not the residue (undissolved phosphonitrile chloride).

EXAMPLE 3

Silicone-Dissolving Composition 3

A 100 g quantity of trimethylsilyl-terminated polydimethyl-siloxane having a viscosity of 50 mPa·s and a minimum chain length of 10 Si units (average chain length: 40 units) is mixed with 0.5 g of phosphonitrile chloride and the mixture is stirred at room temperature for 2 hours. A possible working-up of the solution is effected as in the preceding examples.

EXAMPLE 4

Silicone-Dissolving Composition 4 (Not in Accordance with the Present Invention)

A 100 g quantity of dimethylvinylsilyl-terminated polydimethyl-siloxane having a viscosity of 100 mPa·s and a minimum chain length of 10 Si units (average chain length: 70 units) is mixed with 0.5 g of phosphonitrile chloride and the mixture is stirred at room temperature for 2 hours. A possible working-up of the solution is effected as in the preceding examples.

EXAMPLE 5

Dissolving a Polydimethylsiloxane Composition 10 square centimetres of a 100 μm thin layer of a crosslinked silicone composition (ELASTOSIL® LR 3003/40 from Wacker Chemie AG, Munich) are overcoated with 50 ml of solution from Example 1. Complete dissolution of the layer was achieved with the following application conditions:
a) room temperature: 30 min
b) room temperature under ultrasonication: 5 min
c) 80° C.: 10 min
d) 80° C. under ultrasonication: 1 min

EXAMPLE 6

Dissolving a Polydimethylsiloxane Composition 10 square centimetres of a 200 μm thin layer of a crosslinked silicone composition (ELASTOSIL® LR 3003/40 from Wacker Chemie AG, Munich) are overcoated with 50 ml of solution from Example 3. Complete dissolution of the layer was achieved with the following application conditions:
a) room temperature: 45 min
b) room temperature under ultrasonication: 7 min
c) 80° C.: 13 min
d) 80° C. under ultrasonication: 3 min

EXAMPLE 7

Dissolving a Polydimethylsiloxane Composition (Not in Accordance with the Present Invention)

10 square centimetres of a 200 μm thin layer of a crosslinked silicone composition (ELASTOSIL® LR 3003/40) are overcoated with 50 ml of solution from Example 4. Complete dissolution of the layer was only achieved under significantly time-extended application conditions:
a) room temperature: 60 min
b) room temperature under ultrasonication: 15 min
c) 80° C.: 20 min
d) 80° C. under ultrasonication: 8 min In what follows, the interaction especially the swelling of various plastics which come into contact with silicone-dissolving compositions is investigated. Treatment time was in each case 24 h at a temperature of 20° C. Table 1 below illustrates the results by measuring weight increases in [%] of about 100 μm thick unsupported films of the reported plastics. 10 cm² of commercially available films/starting materials were used. Percentage swelling was determined by weighing the film with an analytical balance before and after. The degree to which polymers swell depends mainly on their chemistry (solubility parameters), and so it is types of polymer which are mentioned by way of example and not specific formulations.

NE1 Composition 1 which is not in accordance with the present invention:
   purely hexamethyldisiloxane
NE2 Composition 2 which is not in accordance with the present invention:
   average chain length: 5 Si units (corresponds to a mixture of short-chain linear and cyclic polydimethylsiloxanes)
E Example 1 composition which is in accordance with the present invention.

TABLE 1

| Weight increases in [%] | NE1 | NE2 | E |
|---|---|---|---|
| Acrylonitrile/butadiene/styrene | 5 | 2 | 0 |
| Epoxy resin | 3 | 1 | 0 |
| Ethylene-polyvinyl acetate | 1 | 0 | 0 |
| Melamine | 1 | 0 | 0 |
| Natural rubber | 5 | 2 | 0.5 |
| Polyamide | 3 | 0.5 | 0 |
| Polybutylene terephthalate | 2 | 1 | 0 |
| Polycarbonate | 4 | 2 | 0 |
| Polyetheretherketone | 3 | 1 | 0 |
| Polyetherimide | 5 | 3 | 0 |
| Polyethersulphone | 4 | 2 | 0 |
| Polyethylene (d > 0.94) | 7 | 3 | 0 |
| Polyethylene terephthalate | 4 | 1 | 0 |
| Polyethylene terephthalate | 4 | 1 | 0 |
| Polyimides (polybenzimidazole, polybismaleimide, polyetherimide, polyamideimide) | 6 | 2 | 0 |
| Polymethyl methacrylate | 4 | 2 | 0 |
| Polyoxymethylene | 5 | 1 | 0 |
| Polypropylene | 5 | 2 | 0.5 |
| Polystyrene | 5 | 2 | 0 |
| Polytetrafluoroethylene | 6 | 4 | 1 |
| Polyurethane | 4 | 1 | 0 |
| Polyvinyl chloride | 7 | 3 | 0.5 |
| Styrene-acrylonitrile | 8 | 4 | 0.5 |
| Vinyl chloride-vinyl acetate copolymer | 3 | 1 | 0 |

As is apparent from Table 1, the surprising finding was that compositions which are in accordance with the present invention are particularly useful for removing silicone residues without showing any adverse effect (swelling for example) on the surfaces/substrates from which they were removed.

The invention claimed is:

1. Composition for removal of crosslinked polydimethylsiloxanes, containing:
   A) at least one phosphonitrile halide compound, and
   B) at least one linear polydimethylsiloxane having a chain length of 10 to 50 Si units and a molar mass of 730 g/mol to 5000 g/mol.

2. The composition of claim 1, wherein 0.1-3.0 parts by weight of A) are used per 100 parts by weight of B).

3. The composition of claim 1, wherein A) is phosphonitrile chloride.

4. The composition of claim 2, wherein A) is phosphonitrile chloride.

5. Process for preparing the composition of claim 1, comprising mixing components A) and B).

6. A method for depolymerization and removal of crosslinked or uncrosslinked silicone residue from surfaces or substrates, comprising applying a composition of claim 1 to the silicone residue.

* * * * *